(12) United States Patent
Chien et al.

(10) Patent No.: US 12,498,900 B2
(45) Date of Patent: Dec. 16, 2025

(54) PROJECTOR AND PROJECTION SYSTEM

(71) Applicant: Coretronic Corporation, Hsin-Chu (TW)

(72) Inventors: Wei-Min Chien, Hsin-Chu (TW); Hwai-Ning Hsueh, Hsin-Chu (TW); Yi-Cheng Hou, Hsin-Chu (TW); Ming-Ying Kuo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 273 days.

(21) Appl. No.: 17/730,226

(22) Filed: Apr. 27, 2022

(65) Prior Publication Data
US 2022/0377292 A1 Nov. 24, 2022

(30) Foreign Application Priority Data
May 21, 2021 (CN) .................. 202121099047.X (51) Int. Cl.
*G06F 3/16* (2006.01)
*H02J 50/80* (2016.01)
*H04W 4/80* (2018.01)

(52) U.S. Cl.
CPC ............. *G06F 3/167* (2013.01); *H02J 50/80* (2016.02); *H04W 4/80* (2018.02)

(58) Field of Classification Search
CPC .......... G06F 3/167; H02J 50/80; H04W 4/80; H04N 9/3141; H04N 9/3194
See application file for complete search history.

(56) References Cited

U.S. PATENT DOCUMENTS

| | | | | |
|---|---|---|---|---|
| 8,947,042 | B2 * | 2/2015 | Kirby | H02J 50/80 320/108 |
| 9,716,402 | B2 * | 7/2017 | Kirby | H02J 50/12 |
| 10,404,107 | B2 * | 9/2019 | Ichikawa | H04B 5/79 |
| 2002/0063855 | A1 * | 5/2002 | Williams | G06F 1/1639 348/E5.143 |
| 2006/0184705 | A1 * | 8/2006 | Nakajima | H02J 7/00047 348/E5.042 |
| 2007/0103110 | A1 * | 5/2007 | Sagoo | H02J 50/80 320/109 |
| 2008/0258679 | A1 * | 10/2008 | Manico | G06F 1/1632 320/106 |
| 2010/0225270 | A1 * | 9/2010 | Jacobs | H02J 50/90 320/108 |
| 2013/0244578 | A1 * | 9/2013 | Bacioccola | H04M 1/72415 455/41.2 |

(Continued)

FOREIGN PATENT DOCUMENTS

| CN | 107408371 | 3/2020 |
|---|---|---|
| CN | 111123628 | 5/2020 |

(Continued)

*Primary Examiner* — Jinsong Hu
*Assistant Examiner* — Rui M Hu
(74) *Attorney, Agent, or Firm* — JCIPRNET (57) ABSTRACT

A projector and a projection system are provided. The projection system includes the projector and a mobile device. The projector receives an audio-visual signal coming from the mobile device via a default wireless domain when the projector is connected to the mobile device, and outputs an image according to the audio-visual signal. The projector also charges the mobile device.

11 Claims, 6 Drawing Sheets

(56) References Cited

U.S. PATENT DOCUMENTS

| | | | | |
|---|---|---|---|---|
| 2014/0342660 A1* | 11/2014 | Fullam | | H04N 21/4122 455/3.06 |
| 2014/0342670 A1* | 11/2014 | Kang | | H04L 69/14 455/67.11 |
| 2015/0028802 A1* | 1/2015 | Lee | | H02J 50/10 320/108 |
| 2015/0137750 A1* | 5/2015 | Kirby | | H02J 50/12 320/108 |
| 2016/0255390 A1* | 9/2016 | Luo | | H04N 21/43637 725/81 |
| 2016/0282904 A1* | 9/2016 | Brabenac | | G06F 1/1698 |
| 2016/0295162 A1* | 10/2016 | Kato | | H04W 4/80 |
| 2016/0306762 A1* | 10/2016 | Lee | | H02J 50/10 |
| 2016/0381202 A1* | 12/2016 | Koo | | G06F 1/1632 455/559 |
| 2017/0341519 A1* | 11/2017 | Ely | | B60L 53/12 |
| 2019/0027953 A1* | 1/2019 | Rohmer | | H02J 7/0044 |
| 2019/0034901 A1* | 1/2019 | Gaur | | G07F 17/0014 |
| 2020/0257496 A1* | 8/2020 | Lee | | G10L 15/30 |
| 2021/0105051 A1* | 4/2021 | Min | | H04B 7/0617 |
| 2021/0203881 A1* | 7/2021 | Zhou | | G06F 3/03547 |
| 2021/0344802 A1* | 11/2021 | Lin | | G09G 5/12 |
| 2022/0101847 A1* | 3/2022 | Receveur | | G10L 21/0216 |
| 2022/0247241 A1* | 8/2022 | Robert | | B60L 53/38 |
| 2022/0272399 A1* | 8/2022 | Zhang | | H04M 1/72412 |
| 2022/0350770 A1* | 11/2022 | Bach | | G06K 7/1417 |
| 2023/0300911 A1* | 9/2023 | Ha | | H02J 7/00045 370/310 |

FOREIGN PATENT DOCUMENTS

| | | |
|---|---|---|
| TW | I450513 | 8/2014 |
| TW | M519750 | 4/2016 |
| TW | 202019053 | 5/2020 |

* cited by examiner

PROJECTOR AND PROJECTION SYSTEM

CROSS-REFERENCE TO RELATED APPLICATION

This application claims the priority benefit of China application serial no. 202121099047.X, filed on May 21, 2021. The entirety of the above-mentioned patent application is hereby incorporated by reference herein and made a part of this specification.

BACKGROUND

Technical Field

This disclosure relates to a projection technology, and in particular to a projector and a projection system that are able to communicate with a mobile device.

Description of Related Art

In general, due to the limited size of a mobile device (such as a smart phone or a tablet), an image that the mobile device may display is relatively small. Therefore, a user has to use the mobile device in close proximity. There are also many smart devices on the market that allow the user to use the product by itself at home despite being away from the mobile device. However, such smart devices are smart speakers with a small display device (approximately 4 inches to 7 inches), which are unable to provide a larger image, and these smart device are unable to be integrated with the mobile device.

The information disclosed in this background section is only for enhancement of understanding of the background of the described technology and therefore it may contain information that does not form the prior art that is already known to a person of ordinary skill in the art. Furthermore, the information disclosed in this section does not mean that one or more problems to be resolved by one or more embodiments of the disclosure were acknowledged by a person of ordinary skill in the art.

SUMMARY

This disclosure provides a projector and a projection system capable of communicating with a mobile device.

Other objectives and advantages of the disclosure may be further understood from the technical features disclosed in the disclosure.

In an embodiment of the disclosure, the projector includes a wireless communication module, a controller, a wireless charging module, and an image output module. The wireless communication module communicates with the mobile device and provides a default wireless domain. The controller is coupled to the wireless communication module. The controller provides a control signal when it is connected to the mobile device via the wireless communication module. The projector responds to the control signal to receive an audio-visual signal coming from the mobile device via the default wireless domain. The wireless charging module is coupled to the controller. The wireless charging module responds to the control signal to charge the mobile device. The image output module is coupled to the controller. The image output module outputs an image according to the audio-visual signal.

In an embodiment of the disclosure, the projection system includes a mobile device and a projector. The projector is connected to the mobile device in the default wireless domain, receives an audio-visual signal coming from the mobile device via the default wireless domain, charges the mobile device, and outputs an image according to the audio-visual signal.

Based on the above, the embodiments of the disclosure have at least one of the following advantages. The projector is able to connect to a mobile device. The projector receives the audio-visual signal coming from the mobile device when the projector is connected to the mobile device, and outputs the image according to the audio-visual signal. In this way, the projector provides a larger screen. In addition, the projector also charges the mobile device wirelessly when the projector is connected to the mobile device. In this way, the usage time of the mobile device may be extended.

Other objectives, features and advantages of the disclosure can be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the descriptions, serve to explain the principles of the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The usage of "including", "comprising", or "having", and variations thereof herein is meant to encompass the items listed thereafter and equivalents thereof as well as additional items. Unless limited otherwise, the terms "connected", "coupled", and "mounted", and variations thereof herein are used broadly and encompass direct and indirect connections, couplings, and mountings.

Figure 1:
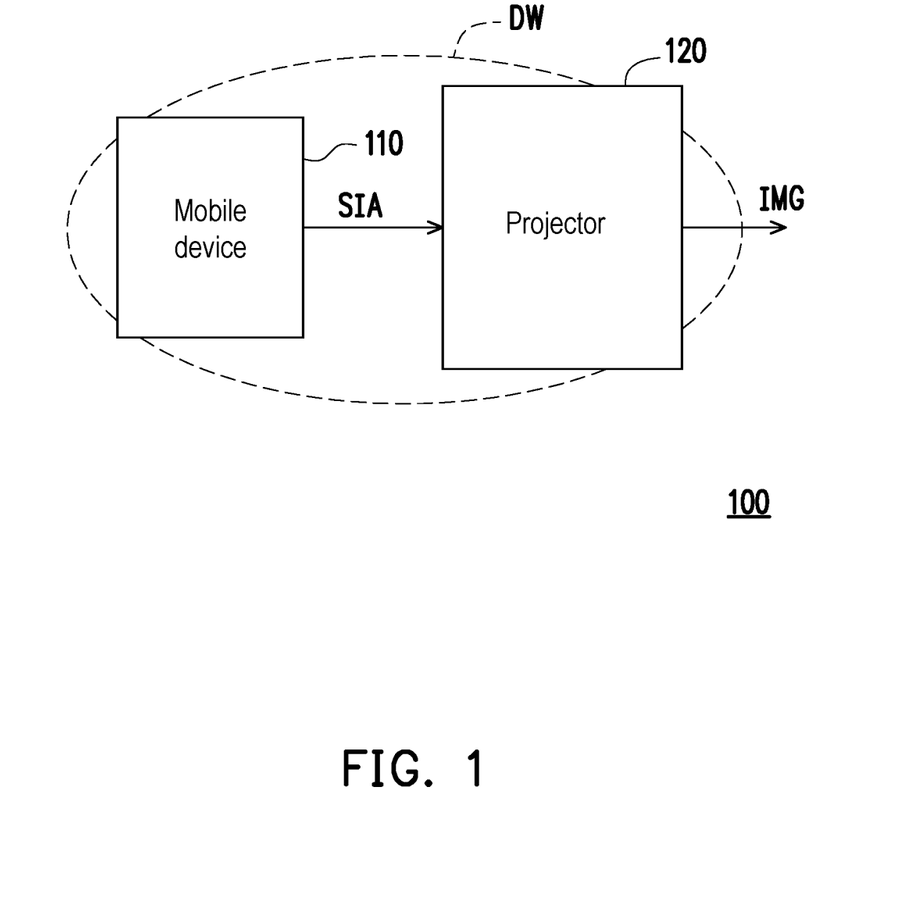
FIG. 1 is a schematic diagram of a projection system according to a first embodiment of the disclosure.

With reference to FIG. 1, FIG. 1 is a schematic diagram of a projection system according to a first embodiment of the disclosure. In the embodiment, a projection system 100 includes a mobile device 110 and a projector 120. The mobile device 110 is, for example, a device such as a smart phone or a tablet computer. The projector 120 is, for example, a device that projects an image IMG onto a target object (such as a wall or a projection screen). The projector 120 is able to project images of 30 to 60 inches. In the embodiment, the projector 120 is connected to the mobile device 110, receives an audio-visual signal SIA provided by the mobile device 110 via a default wireless domain DW, and outputs the image IMG according to the audio-visual signal SIA. The projector 120 also charges the mobile device 110.

Specifically, the projector 120 is connected to the mobile device 110 when the mobile device 110 is close to the projector 120. In the embodiment, the projector 120 identifies the mobile device 110. The projector 120 and the mobile device 110 are connected when the projector 120 determines that the mobile device 110 is a tagged device. The projector 120 establishes the default wireless domain DW. Next, the projector 120 receives the audio-visual signal SIA provided by the mobile device 110 via the default wireless domain DW. Therefore, the projector 120 may output (project) the image IMG according to the audio-visual signal SIA. In addition, after being connected to the mobile device 110, the projector 120 also charges the mobile device 110 wirelessly.

It should be noted here that the projector 120 receives the audio-visual signal SIA coming from the mobile device 110 and outputs the image IMG according to the audio-visual signal SIA when the projector 120 is connected to the mobile device 110. In this way, the projector 120 provides a larger image. In addition, the projector 120 also charges the mobile device 110 wirelessly when it is connected to the mobile device 110. In this way, a usage time of the mobile device 110 may be extended.

Figure 2:
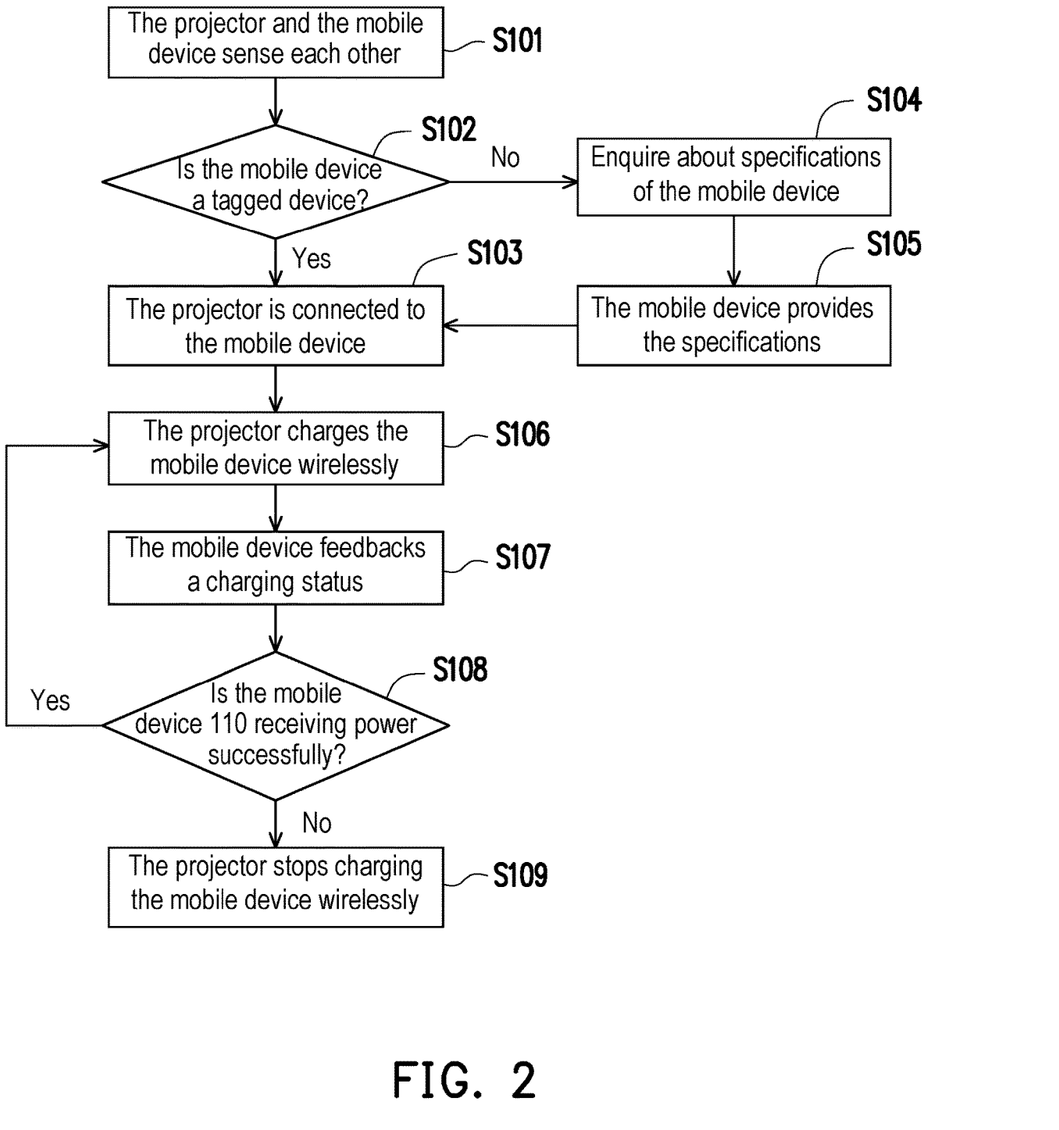
FIG. 2 is an operation flowchart according to an embodiment of the disclosure.

With reference to FIGS. 1 and 2 concurrently, FIG. 2 is an operation flowchart according to an embodiment of the disclosure. In the embodiment, the operation flow illustrated in FIG. 2 is used for a wireless charging operation of the projection system 100. In Step S101, the projector 120 senses the mobile device 110. For example, the projector 120 senses the mobile device 110 based on wireless communication. In the embodiment, the wireless communication may be, for example, Wi-Fi, near-field communication (NFC), Bluetooth, Bluetooth Low Energy (BLE), etc. The projector 120 determines whether the mobile device 110 is a tagged device in Step S102. When the mobile device 110 is determined to be a tagged device, this means that the projector 120 is able to identify the mobile device 110 and has obtained a charging specification of the mobile device 110. Next, the projector 120 connects to the mobile device 110 in Step S103. After that, Step S106 is executed, in Step S106, the projector 120 charges the mobile device 110 wirelessly. In the embodiment, the mobile device 110 may be close to or in contact with the projector 120 to receive a wireless power provided by the projector 120.

On the other hand, when the mobile device 110 is determined not to be a tagged device in the Step S102, this means that the projector 120 cannot identify the mobile device 110 and cannot obtain the charging specification of the mobile device 110. Therefore, Step S104 is executed, the projector 120 enquires about specifications of the mobile device 110 in Step S104. After receiving the inquiry from the projector 120, the mobile device 110 provides the specifications of the mobile device 110 in Step S105. The specifications of the mobile device 110 include the charging specification. Next, the projector 120 connects to the mobile device 110 in the Step S103 when the projector 120 receives the specifications of the mobile device 110.

When the projector 120 charges the mobile device 110 wirelessly, Step S107 is executed. In Step S107, the mobile device 110 feedbacks a charging status. In other words, the mobile device 110 feedbacks the charging state to the projector 120 during the charging process. Next, in Step S108, the projector 120 determines whether the mobile device 110 has received the power successfully. In the embodiment, the projector 120 may obtain a charging status of the mobile device 110 according to the charging state being feedback to the mobile device 110, and determine whether the mobile device 110 has received the power successfully according to the charging status. The projector 120 returns to the Step S106 to continue charging the mobile device 110 wirelessly when the mobile device 110 is determined to has received the power successfully.

On the other hand, the projector 120 stops charging the mobile device 110 wirelessly in Step S109 when the mobile device 110 is determined to be unsuccessful in receiving the power. In the embodiment, the unsuccessful power-receiving situation may be that the mobile device 110 has entered a fully charged state or the mobile device 110 is far away from the projector 120.

Figure 3:
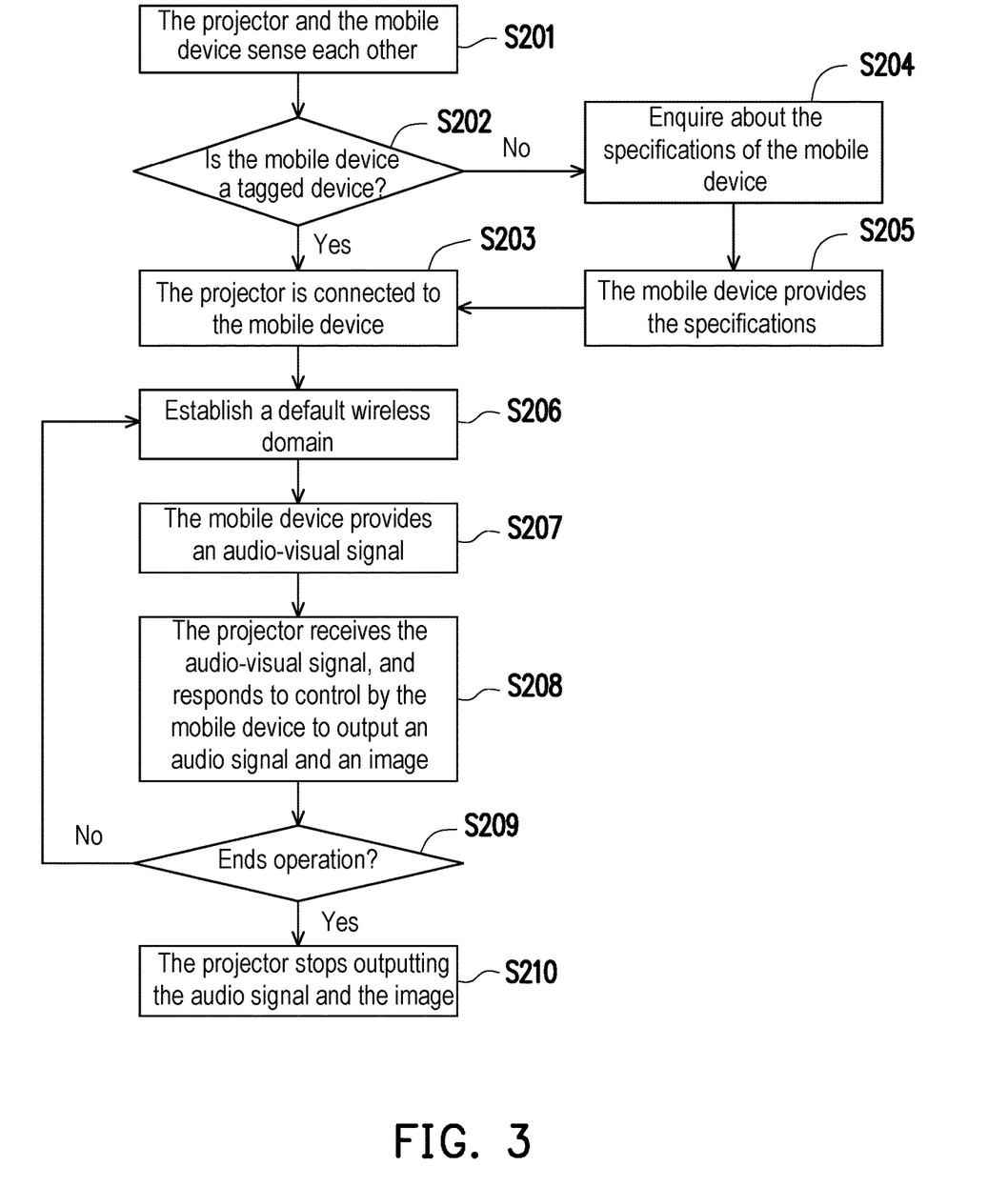
FIG. 3 is an operation flowchart according to another embodiment of the disclosure.

With reference to FIGS. 1 and 3 concurrently, FIG. 3 is an operation flowchart according to another embodiment of the disclosure. In the embodiment, the operation flow illustrated in FIG. 3 is used for an audio-visual signal SIA transmission operation of the projection system 100. In Step S201, the projector 120 senses the mobile device 110. The projector 120 senses the mobile device 110 based on wireless communication. After that, the projector 120 determines whether the mobile device 110 is a tagged device in Step S202. When the mobile device 110 is determined to be a tagged device, this means that the projector 120 is able to identify the mobile device 110, the projector 120 connects to the mobile device 110 in Step S203. Next, in Step S206, the projector 120 establishes the default wireless domain DW.

On the other hand, when the mobile device 110 is determined not to be a tagged device in the Step S202, this means that the projector 120 cannot identify the mobile device 110 and cannot obtain an audio-visual specification of the mobile device 110. Therefore, Step S204 is executed, the projector 120 enquires about the specifications of the mobile device 110 in Step S204. After receiving the inquiry from the projector 120, the mobile device 110 provides the specifications of the mobile device 110 in Step S205. The specifications of the mobile device 110 include the audio-visual specification, that is, a signal specification of the audio-visual signal SIA provided by the mobile device 110. Next, the projector 120 connects to the mobile device 110 in the Step S203 when the projector 120 receives the specifications of the mobile device 110.

After the projector 120 establishes the default wireless domain DW, Step S207 is executed. In Step S207, the mobile device 110 provides the audio-visual signal SIA to the projector 120. In other words, the mobile device 110 provides the audio-visual signal SIA after the default wireless domain DW is established and the projector 120 is connected to the mobile device 110. The audio-visual signal SIA is, for example, a movie or a screen image of the mobile device 110, but is not limited thereto.

Next, in Step S208, the projector 120 receives the audio-visual signal SIA. Furthermore, the projector 120 receives the audio-visual signal SIA provided by the mobile device 110 via the default wireless domain DW. In addition, the projector 120 is able to respond to control by the mobile device 110 to output an audio signal and the image IMG associated with the audio-visual signal SIA. In the embodiment, the mobile device 110 may provide a first control command, and the first control command is a control command associated with "playback". The projector 120 is able to respond to the first control command to output the audio signal and the image IMG associated with the audio-visual signal SIA.

After that, Step S209 is executed. In Step S209, the projection system 100 responds to a second control command to end the operation. In the embodiment, the mobile device 110 may also provide the second control command. The second control command is a control command associated with "stop playback". For example, when the mobile device 110 provides the second control command (for example, a user presses a physical stop button or a virtual stop button, a voice command, the mobile device 110 turning off the screen or is idle for a predetermined period of time), the projection system 100 responds to the second control command in Step S210 to end the operation. For example, in the Step S210, the mobile device 110 stops providing the audio-visual signal SIA. In addition, in the Step S210, the projector 120 stops outputting the audio signal and the image IMG and enters a standby state or a hibernation state. In other embodiments, the projector 120 may be provided with an power button (not shown), which is configured to provide the second control command.

On the other hand, when it is determined in the Step S209 that the second control command has not been received, the projector 120 continues to perform the operations of Steps S207 to S209.

In some embodiments, the default wireless domain DW may be established before the Step S201. In some embodiments, the default wireless domain DW may be established between the Steps S201 and S202. In some embodiments, the default wireless domain DW may be established between the Steps S202 and S203. That is, in some embodiments, the default wireless domain DW may be established in advance. An operation timing of the Step S206 of the disclosure is not limited to the embodiment. However, in the embodiment, the default wireless domain DW is established after the Step S203, which may reduce power consumption of the projector 120.

Figure 4:
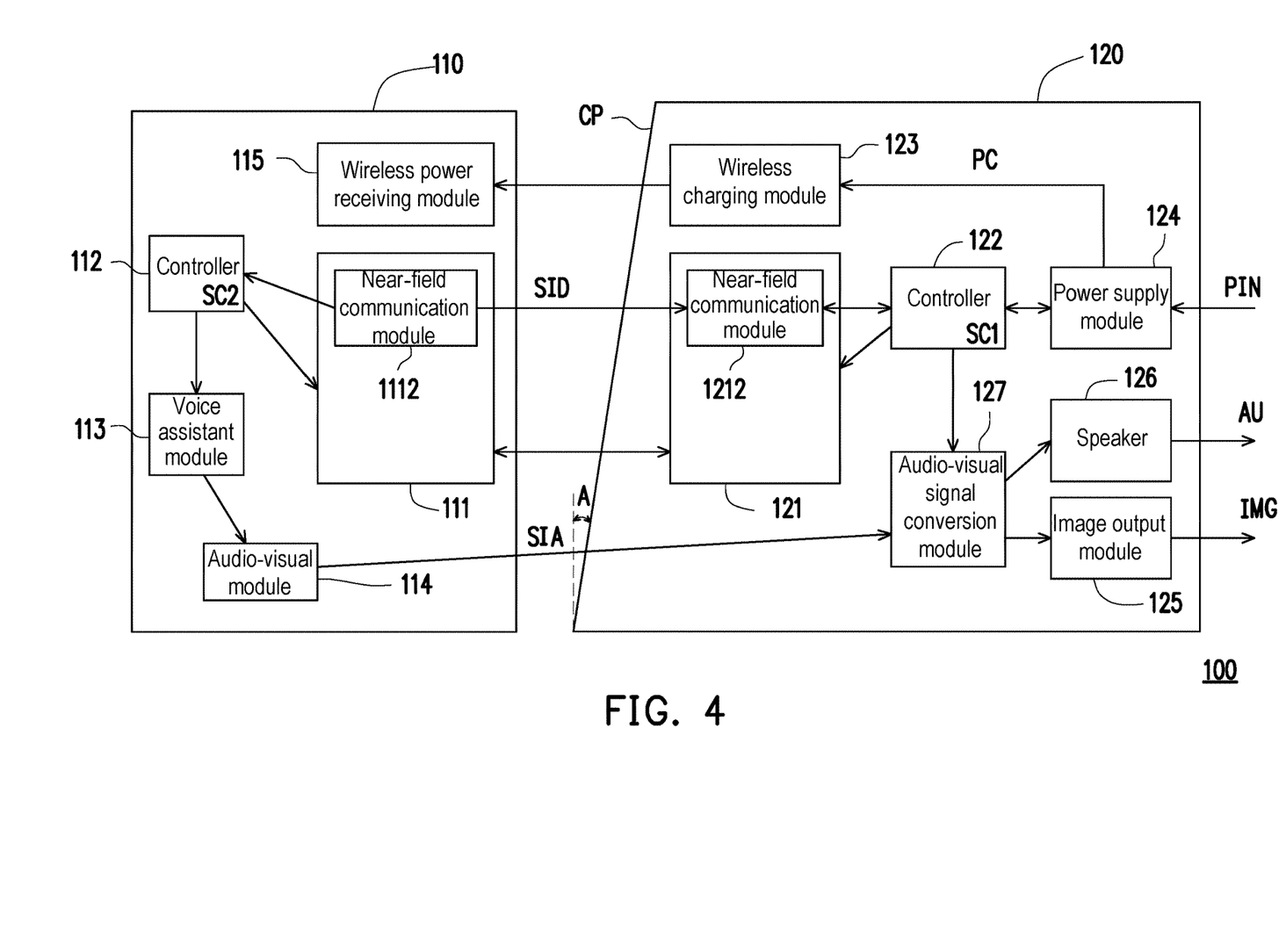
FIG. 4 is a schematic diagram of a device of the projection system according to the first embodiment of the disclosure.

To further illustrate implementation details of the first embodiment, reference is made to FIGS. 1 and 4 concurrently. FIG. 4 is a schematic diagram of a device of the projection system according to the first embodiment of the disclosure. In the embodiment, the mobile device 110 includes a wireless communication module 111, a controller 112, and a voice assistant module 113. The wireless communication module 111 is connected to the projector 120, the controller 112 is coupled to the wireless communication module 111, and the voice assistant module 113 is coupled to the controller 112. The controller 112 provides a control signal SC2 to the voice assistant module 113 when connected to the projector 120 via the wireless communication module 111, and the voice assistant module 113 responds to the control signal SC2 and is activated. In the embodiment, the controller 112 provides the control signal SC2 after the mobile device 110 uses the wireless communication module 111 to be connected to the projector 120, and activates the voice assistant module 113 according to the control signal SC2. In other words, the projection system 100 requests the controller 112 to activate a voice receiving function of the voice assistant module 113 when the projector 120 is connected to the mobile device 110. The voice assistant module 113 is able to receive a voice command of the user after the voice assistant module 113 is activated, and generate one of multiple control commands (such as the first control command or the second control command) according to the voice command of the user. In the embodiment, the mobile device 110 may respond to one of the multiple control commands and provides the audio-visual signal SIA or stops providing the audio-visual signal SIA. For example, the mobile device 110 provides the audio-visual signal SIA to the default wireless domain DW when connected to the projector 120 via the wireless communication module 111.

In the embodiment, the projector 120 includes a wireless communication module 121, a controller 122, and an image output module 125. The controller 122 is coupled to the wireless communication module 121 and the image output module 125. The wireless communication module 121 communicates with the mobile device 110 and is able to provide the default wireless domain DW. The image output module 125 outputs the image IMG according to the audio-visual signal SIA. In the embodiment, the wireless communication module 121 is able to communicate with the wireless communication module 111, and the controller 122 is able to use the aforementioned communication to identify the mobile device 110. The wireless communication module 111 connects to the wireless communication module 121 when the mobile device 110 is identified as a tagged device. After the connection is established, the wireless communication module 111 provides the default wireless domain DW. Next, the mobile device 110 provides the audio-visual signal SIA to the default wireless domain DW, and the projector 120 receives the audio-visual signal SIA coming from the mobile device 110 via the default wireless domain DW. Furthermore, in the embodiment, the controller 122 provides a control signal SC1 when connected to the mobile device 110 via the wireless communication module 121, and the projector 120 responds to the control signal SC1 to receive the audio-visual signal SIA coming from the mobile device 110 via the default wireless domain DW.

In the embodiment, the projector 120 further includes a speaker 126 and an audio-visual signal conversion module 127. The audio-visual signal conversion module 127 is coupled to the controller 122. The mobile device 110 further includes an audio-visual module 114, and the audio-visual module 114 provides the audio-visual signal SIA to the default wireless domain DW. The audio-visual signal conversion module 127 receives the audio-visual signal SIA coming from the mobile device 110 via the default wireless domain DW, and converts a signal format of the audio-visual signal SIA. In the embodiment, the audio-visual signal conversion module 127 further responds to the control signal SC1 to generate an audio signal AU and image data associated with the audio-visual signal SIA. The speaker 126 receives the audio signal AU and plays the audio signal AU. The image output module 125 receives the image data and projects the image IMG. In another example, in the embodiment, the audio-visual module 114 of the mobile device 110 is coupled to the voice assistant module 113, and the voice assistant module 113 is adapted to provide the first control command and the second control command. The audio-visual module 114 responds to the first control command to provide the audio-visual signal SIA, and responds to the second control command to stop providing the audio-visual signal SIA, but is not limited thereto.

It should be noted here that the voice assistant module 113 is activated to receive the voice command of the user when the projector 120 is connected to the mobile device 110, and generates associated control commands. The projector 120 uses the speaker 126 to play the audio signal AU loudly, and uses the image output module 125 to project the image IMG over a large area. In this way, the projection system 100 may improve an audiovisual experience of the user.

In the embodiment, other control commands may be commands configured to select a movie to be played, adjust a volume of the speaker 126, and adjust projection resolution of the image IMG projected by the image output module 125.

Furthermore, in the embodiment, the mobile device 110 further includes a wireless power receiving module 115, and the projector 120 further includes a wireless charging module 123 and a power supply module 124. The wireless charging module 123 is coupled to the controller 122 and is configured to indirectly or directly respond to the control signal SC1 to charge the mobile device 110 wirelessly. In detail, the power supply module 124 receives an input power PIN (e.g., supply mains) and converts it to a power required by the projector 120. For example, the controller 122 may receive power from the power supply module 124 for continuous operation. After the connection is established, the power supply module 124 responds to the control signal SC1 to provide a charging power PC to the wireless charging module 123, and the wireless charging module 123 generates a wireless charging power based on the charging power PC, and provides the wireless charging power to the wireless power receiving module 115 to charge the mobile device 110 wirelessly.

In the embodiment, the mobile device 110 wakes the projector 120 from the hibernation state when the wireless communication module 121 is connected to the mobile device 110, or the projector 120 (in the hibernation state) receives at least one of the voice command of the user and a communication call on the mobile device 110. In the embodiment, in the hibernation state, for example, only the wireless communication module 121, the controller 122, and the power supply module 124 maintain a running state. That is, the power supply module 124 only provides the power to the wireless communication module 121 and the controller 122. Specifically, in the embodiment, when the mobile device 110 does not input an operation command or turn off the screen within a predetermined period of time, so that the audio-visual module 114 stops or suspends providing the audio-visual signal SIA, that is, the projector 120 does not receive the audio-visual signal SIA, the projector 120 may enter into the hibernation state, but the disclosure is not limited thereto.

Furthermore, in the embodiment, the wireless communication module 111 of the mobile device 110 includes a near-field communication module 1112 coupled to the controller 112, and the wireless communication module 121 of the projector 120 includes a near-field communication module 1212 coupled to the controller 122. The near-field communication module 1112 is operated to provide an identification signal SID. The identification signal SID includes the specifications of the mobile device 110. Then, the controller 122 of the projector 120 receives the identification signal SID via the near-field communication module 1212, identifies the mobile device 110 based on the identification signal SID, and provides the control signal SC1 according to an identification result.

In some embodiments, the projection system 100 may establish connection by communication between the near-field communication module 1112 and the near-field communication module 1212. In this way, the projection system 100 may confirm that the mobile device 110 is close to the projector 120.

In the embodiment, the projector 120 also includes a contact surface CP. An inclination angle A between the contact surface CP and a vertical reference surface (for example, parallel to a direction of gravity), and the inclination angle A is between 2 degrees and 45 degrees (or an inclination angle between the contact surface CP and a horizontal reference surface is between 45 degrees to 88 degrees). In this way, based on the inclination angle A, it is easier to place the mobile device 110 on the contact surface CP of the projector 120, and the wireless charging module 123 charges the mobile device 110 placed on the contact surface CP. In addition, based on the inclination angle A, a gravity sensor (not shown) of the mobile device 110 may more easily detect a placement orientation of the mobile device 110, thereby confirming whether the wireless power receiving module 115 of the mobile device 110 is adjacent to the wireless charging module 123 of the projector 120, and a display direction of a screen of the mobile device 110.

In the embodiment, the wireless communication module 111 and the wireless communication module 121 may be respectively implemented by wireless communication circuits known to those skilled in the art. The near-field communication module 1112 and the near-field communication module 1212 may be respectively implemented by communication circuits that comply with the near-field communication protocol. The controller 112 and the controller 122 are, for example, a central processing unit (CPU), or other programmable general-purpose or special-purpose microprocessors, a digital signal processor (DSP), a programmable controller, an application-specific integrated circuit (ASIC), a programmable logic device (PLD), or other similar devices, or a combination of these devices. The voice assistant module 113 may be implemented by a voice processor with a voice recognition function. The voice assistant module 113 may be integrated into the controller 112. The audio-visual module 114 may be implemented by an audio-visual generating circuit known to those skilled in the art. The wireless power receiving module 115 may be implemented by a power receiving circuit that complies with wireless power transmission specifications. The wireless charging module 123 may be implemented by a power supply circuit that complies with the wireless power transmission specifications. The power supply module 124 may be implemented by a power conversion circuit. The image output module 125 may be an image projection device in the projector 120. The audio-visual signal conversion module 127 may be implemented by a signal format conversion circuit.

Figure 5:
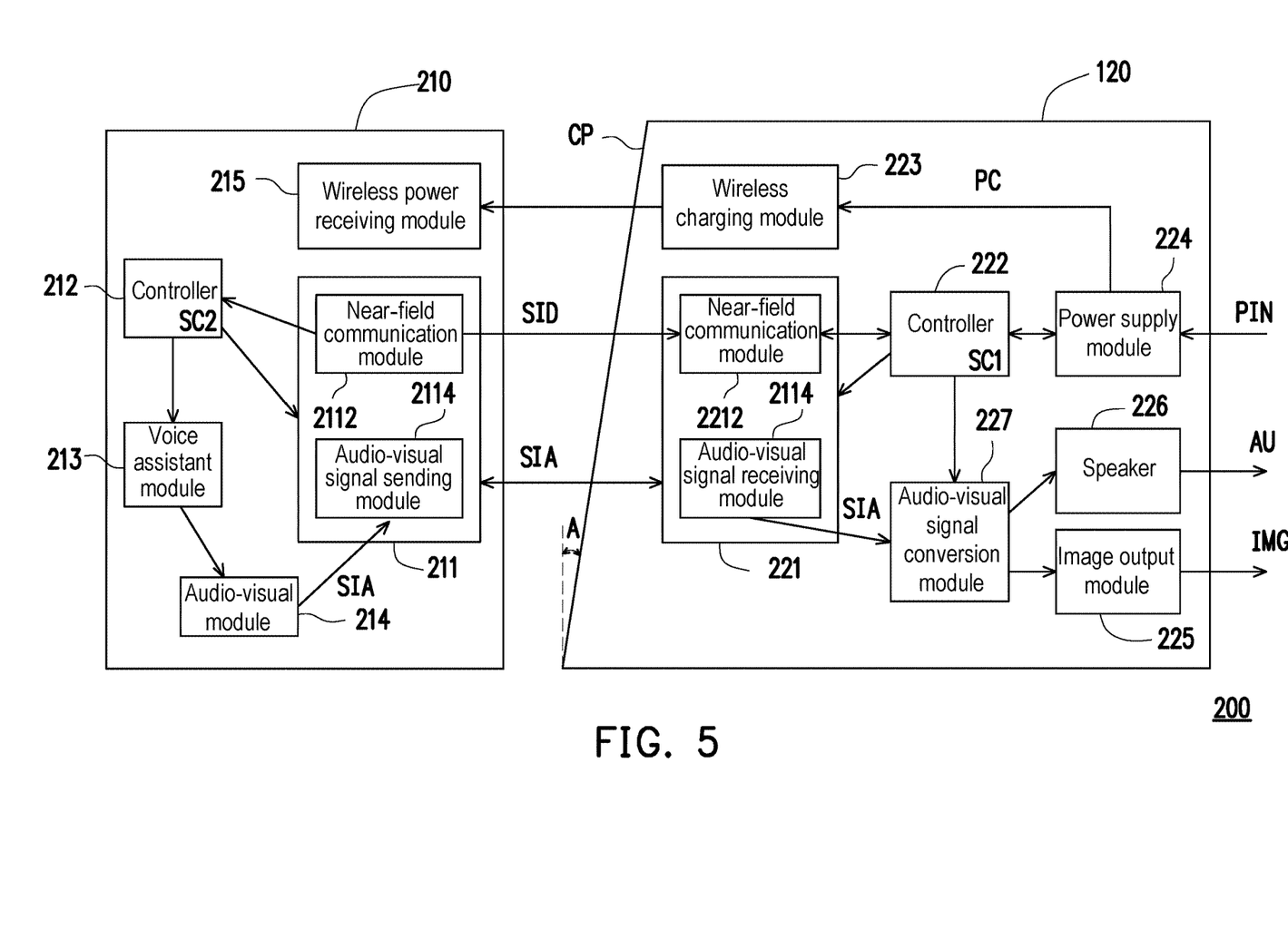
FIG. 5 is a schematic diagram of a projection system according to a second embodiment of the disclosure.

With reference to FIG. 5, FIG. 5 is a schematic diagram of a projection system according to a second embodiment of the disclosure. In the embodiment, a projection system 200 includes a mobile device 210 and a projector 220. The mobile device 210 includes a wireless communication module 211, a controller 212, a voice assistant module 213, an audio-visual module 214, and a wireless power receiving module 215. The projector 220 includes a wireless communication module 221, a controller 222, a wireless charging module 223, a power supply module 224, an image output module 225, a speaker 226, and an audio-visual signal conversion module 227. A difference between the projection system 200 of the embodiment and the projection system 100 in FIG. 4 is that the wireless communication module 211 of the mobile device 210 of the projection system 200 includes a near-field communication module 2112 and an audio-visual signal sending module 2114, and the wireless communication module 221 includes a near-field communication module 2212 and an audio-visual signal receiving module 2214.

In the embodiment, the audio-visual signal sending module 2114 is coupled to the audio-visual module 214 to receive the audio-visual signal SIA, and provides the audio-visual signal SIA to the default wireless domain DW. The audio-visual signal receiving module 2214 is coupled to the controller 222 and the audio-visual signal conversion module 227 and is configured to receive the audio-visual signal SIA coming from the mobile device 210 via the default wireless domain DW, and provide the audio-visual signal SIA to the audio-visual signal conversion module 227. It can be seen that a transmission manner of the audio-visual signal SIA of the projection system 200 is different from a transmission manner of the audio-visual signal SIA of the projection system 100 shown in FIG. 4. Reference may be made to the embodiment in FIG. 3 for details of the cooperative operations of the remaining modules, which are not repeated here.

In an embodiment, the audio-visual signal sending module 2114 responds to the control signal SC2 and is activated, and the audio-visual signal receiving module 2214 responds to the control signal SC1 and is activated. In other words, the audio-visual signal sending module 2114 and the audio-visual signal receiving module 2214 are activated after the mobile device 210 is connected to the projector 220.

Figure 6:
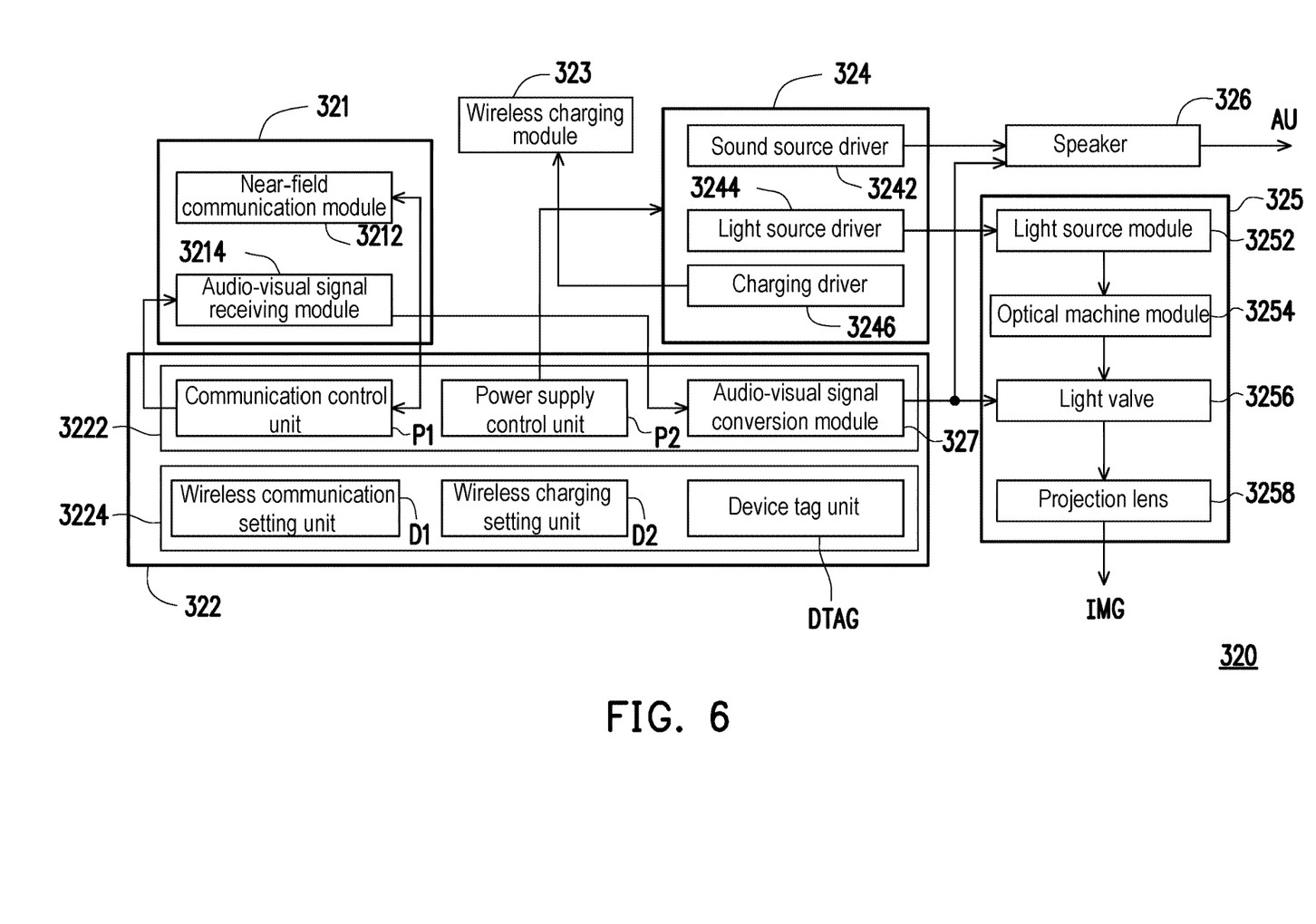
FIG. 6 is a schematic diagram of a projector according to an embodiment of the disclosure.

With reference to FIGS. 2 and 6 concurrently, FIG. 6 is a schematic diagram of a projector according to an embodiment of the disclosure. In the embodiment, a projector 320 includes a wireless communication module 321, a controller 322, a wireless charging module 323, a power supply module 324, an image output module 325, a speaker 326, and an audio-visual signal conversion module 327. The wireless communication module 321 includes a near-field communication module 3212 and an audio-visual signal receiving module 3214. The controller 322 includes a control unit 3222 and a storage unit 3224, and the control unit 3222 includes a communication control unit P1 and a power supply control unit P2. In addition, the audio-visual signal conversion module 327 is integrated into the control unit 3222, but the disclosure is not limited thereto. The storage unit 3224 includes a wireless communication setting unit D1, a wireless charging setting unit D2, and a device tag unit DTAG. The device tag unit DTAG is configured to store tag information of the device, the wireless communication setting unit D1 is configured to store at least one wireless communication specification, and the wireless charging setting unit D2 is configured to store at least one wireless charging specification. The power supply module 324 includes a sound source driver 3242, a light source driver 3244, and a charging driver 3246.

In the embodiment, the control unit 3222 receives tag information (such as the identification signal SID) of a mobile device via the near-field communication module 3212 and the communication control unit P1 after the projector 320 senses the mobile device (such as the mobile device 110 as shown in FIG. 1) in the Step S101. The control unit 3222 determines whether the mobile device is a tagged device in the Step S102. If the tag information of the mobile device (such as the identification signal SID) has been stored in the device tag unit DTAG, this means that the mobile device is a tagged device. Therefore, the control unit 3222 extracts a wireless communication specification corresponding to the tag information of the mobile device from the wireless communication setting unit D1, and extracts a wireless charging specification corresponding to the tag information of the mobile device from the wireless charging setting unit D2. Therefore, in the Step S103, the projector 120 and the mobile device 110 are connected.

On the other hand, when the mobile device is determined not to be a tagged device in the Step S102, the control unit 3222 controls the communication control unit P1 to enquire about specifications of the mobile device in the Step S104, and receive the specifications of the mobile device in the Step S105. Then, the tag information, the wireless communication specification, and the wireless charging specification of the mobile device may be respectively stored in the device tag unit DTAG, the wireless communication setting unit D1, and the wireless charging setting unit D2.

The power control unit P2 may control the charging driver 3246 based on the extracted wireless charging specification. The charging driver 3246 responds to the control by the power control unit P2 to provide a charging power to the wireless charging module 323. Therefore, the wireless charging module 323 charges the mobile device in the Step S106.

In the Step S108, the control unit 3222 determines whether the mobile device has received the power successfully. In the embodiment, the control unit 3222 may obtain a charging status of the mobile device according to a charging state of the mobile device via the communication control unit P1, and determine whether the mobile device has received the power successfully according to the charging status. The control unit 3222 executes the operations of the Steps S106 and S107 when the mobile device is determined to has received the power successfully, so as to continue to charge the mobile device wirelessly. On the other hand, the control unit 3222 stops using the charging driver 3246 in the Step S109 when the mobile device is determined to be unsuccessful in receiving the power.

With reference to FIGS. 3 and 6 concurrently, reference may be made to the Steps S101 to S105 in FIGS. 2 and 6 for implementation content of the projector 320 in the Steps S201 to S205, which are not repeated here. In the embodiment, after the projector 320 is connected to the mobile device in the Step S203, the communication control unit P1 controls the wireless communication module 321 in the Step S206. The wireless communication module 321 responds to the control by the communication control unit P1 to establish the default wireless domain DW, the mobile device is able to provide the audio-visual signal SIA to the default wireless domain DW in the Step S207, and in the Step S208, the audio-visual signal receiving module 3214 receives the audio-visual signal SIA from the default wireless domain DW. In addition, in the embodiment, the wireless communication module 321 also receives one of multiple control commands. For example, the mobile device may provide the first control command, and the first control command is a voice command associated with "playback". The power control unit P2 responds to the first control command to control the sound source driver 3242, the light source driver 3244, and the audio-visual signal conversion module 327. The sound source driver 3242 drives the speaker 326, and the light source driver 3244 drives the image output module 325. In addition, the audio-visual signal conversion module 227 converts the format of the audio-visual signal SIA into the audio signal AU and the image data, and provides the audio signal AU to the speaker 326. The speaker 326 plays the audio signal AU in the Step S208, and the audio-visual signal conversion module 327 controls the image output module 325 based on the image data, so that the image output module 325 projects the image IMG in the Step S208.

For example, in the embodiment, the image output module 325 includes a light source module 3252, an optical machine module 3254, a light valve 3256, and a projection lens 3258. The light source module 3252 responds to the driving by the light source driver 3244 to emit a light source beam (or an illumination beam). The optical machine module 3254 transmits the light source beam (or the illumination beam) to the light valve 3256, and the optical machine module 3254 may be implemented by a combination of a lens and a reflector. The audio-visual signal conversion module 327 controls the image output module 325 based on the image data, so that the image output module 325 projects the image IMG. For example, the audio-visual signal conversion module 327 at least controls the light valve 3256 to convert the light source beam into an image beam (that is, the image IMG) based on the image data, and the projection lens 3258 projects the image beam to the projection screen. Therefore, the image output module 325 is able to project the image IMG in the Step S208. In the embodiment, the light source module 3252 includes, for example, at least one lamp or at least one solid-state illumination source. The solid-state illumination source is, for example, a light-emitting diode or a laser diode. The light valve 3256 may be a light modulation device, and the light modulation device is, for example, a reflective or transmissive spatial light modulator. Taking a reflective spatial light modulator as an example, it may be a reflective liquid crystal on silicon (LCOS) or a digital micro-mirror device (DMD), etc. The transmissive spatial light modulator may be, for example, a transparent liquid crystal panel. In addition, depending on an input control signal manner, the optical modulator is, for example, an optically addressed spatial light modulator (OASLM) or an electrically addressed spatial light modulator (EASLM). The disclosure does not impose any limitation on the form and type of the optical modulator. The optical machine module 3254 and the projection lens 3258 respectively include, for example, a combination of one or more optical lenses having refractive power. The projection lens 3258 includes, for example, various combinations of non-planar lenses such as a bi-concave lens, a bi-convex lens, a meniscus lens, a convex-concave lens, a plano-convex lens, and a plano-concave lens.

In summary, the embodiments of the disclosure have at least one of the following advantages. The projector of the disclosure is able to connect to a mobile device. The projector receives the audio-visual signal coming from the mobile device when the projector is connected to the mobile device, and outputs the image according to the audio-visual signal. In this way, the projector is able to provide a variety of audio and visual effects based on the commands of the mobile device. In addition, the projector also charges the mobile device wirelessly when the projector is connected to the mobile device. In this way, the usage time of the mobile device may be extended.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the terms "the invention", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A projector, comprising a wireless communication module, a controller, a wireless charging module, and an image output module, wherein
   the wireless communication module is configured to communicate with a mobile device and provide a default wireless domain,
   the controller is coupled to the wireless communication module and is configured to provide a control signal when the projector is connected to the mobile device via the wireless communication module, wherein the projector responds to the control signal to receive an audio-visual signal coming from the mobile device via the default wireless domain,
   the wireless charging module is coupled to the controller and is configured to charge the mobile device in response to the control signal, and
   the image output module is coupled to the controller and is configured to output an image according to the audio-visual signal,
   wherein when the projector is in a hibernation state, the wireless communication module and the controller are in a running state, and the image output module and the wireless charging module are in a non-running state, wherein the wireless communication module in the running state is capable of being coupled to the mobile device and communicating with the mobile device, and
   wherein when the projector receives at least one of a voice command and a communication call transmitted from the mobile device, the projector is waken from the hibernation state by the mobile device, so that the image output module and the wireless charging module enter into the running state from the non-running state, and the wireless charging module provides power to charge the mobile device wirelessly.

2. The projector according to claim 1, wherein a voice receiving function of the mobile device is activated when the wireless communication module of the projector is connected to the mobile device.

3. The projector according to claim 1, wherein the wireless communication module comprises:
   a near-field communication module, coupled to the controller, wherein the controller receives an identification signal of the mobile device via the near-field communication module, identifies the mobile device based on the identification signal, and provides the control signal according to an identification result.

4. The projector according to claim 3, wherein the wireless communication module further comprises:
   an audio-visual signal receiving module, coupled to the controller and configured to receive the audio-visual signal coming from the mobile device.

5. The projector according to claim 1, wherein the projector further comprises:

an audio-visual signal conversion module, coupled to the controller and configured to receive the audio-visual signal coming from the mobile device and convert a format of the audio-visual signal.

6. The projector according to claim 1, wherein the projector further comprises a contact surface, wherein the wireless charging module charges the mobile device placed on the contact surface, wherein an inclination angle between the contact surface and a vertical reference surface, wherein the inclination angle is between 2 degrees and 45 degrees.

7. A projection system, comprising a mobile device and a projector, wherein the projector is configured to connect to the mobile device, receive an audio-visual signal coming from the mobile device via a default wireless domain, charge the mobile device, and output an image according to the audio-visual signal, wherein when the projector is in a hibernation state, a first wireless communication module and a first controller of the projector are in a running state, and an image output module and a wireless charging module of the projector are in a non-running state, wherein the first wireless communication module in the running state is capable of being coupled to the mobile device and communicating with the mobile device, and wherein when the mobile device receives at least one of a voice command and a communication call and then the mobile device transmits the at least one of the voice command and the communication call to the projector, the mobile device wakes the projector from the hibernation state, so that the image output module and the wireless charging module of the projector enters into the running state from the non-running state, so that the mobile device is wirelessly charged by receiving power from a wireless charging module of the projector.

8. The projection system according to claim 7, wherein the first controller is coupled to the first wireless communication module and is configured to provide a first control signal when the projector is connected to the mobile device via the first wireless communication module, wherein the projector responds to the first control signal to receive the audio-visual signal coming from the mobile device, the wireless charging module is coupled to the first controller and is configured to respond to the first control signal to charge the mobile device, and the image output module is coupled to the first controller and is configured to output the image according to the audio-visual signal.

9. The projection system according to claim 8, wherein the mobile device comprises a second wireless communication module, a second controller, and a voice assistant module, wherein the second wireless communication module is configured to connect to the projector, the second controller is coupled to the second wireless communication module and is configured to provide a second control signal when the projector is connected to the projector via the second wireless communication module, and the voice assistant module is coupled to the second controller and is configured to respond to the second control signal and be activated.

10. The projection system according to claim 9, wherein the second wireless communication module comprises:

a second near-field communication module, coupled to the second controller and configured to provide specifications of the mobile device, and the first wireless communication module comprises:

a first near-field communication module, coupled to the first controller, wherein the first controller receives the specifications via the first near-field communication module, performs identification based on the specifications, and provides the first control signal according to an identification result.

11. The projection system according to claim 9, wherein the second wireless communication module further comprises:

an audio-visual signal sending module, configured to send the audio-visual signal.

* * * * *